Figure 1:
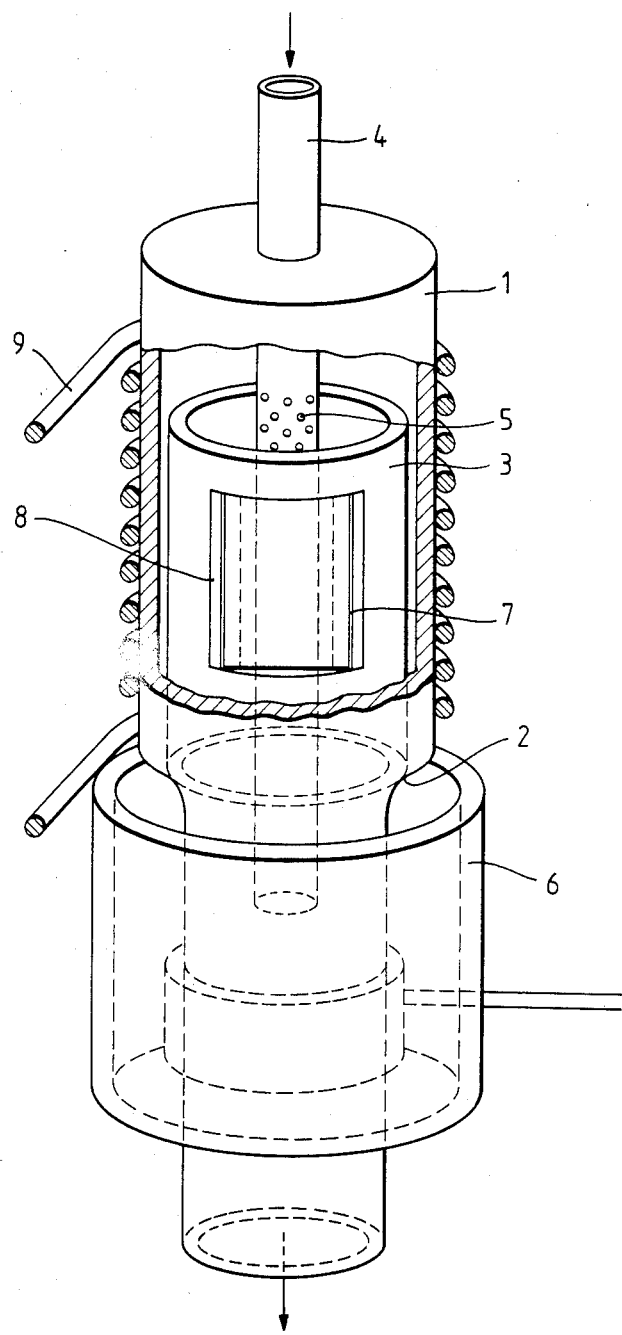

United States Patent [19]

Nourshargh et al.

[11] Patent Number: 4,619,680
[45] Date of Patent: Oct. 28, 1986

[54] MANUFACTURE OF INTEGRATED OPTICAL WAVEGUIDES

[75] Inventors: Noorallah Nourshargh, London; John S. McCormack, Middlesex, both of England

[73] Assignee: The General Electric Co. p.l.c., England

[21] Appl. No.: 742,207

[22] Filed: Jun. 7, 1985

[30] Foreign Application Priority Data

Jun. 11, 1984 [GB] United Kingdom ................ 8414878

[51] Int. Cl.[4] ............................................ C03B 37/027
[52] U.S. Cl. ...................................... 65/3.12; 65/18.2; 427/163; 427/167; 427/419.6
[58] Field of Search .......................... 65/3.12, 31, 18.2; 427/163, 167, 419.6

[56] References Cited

U.S. PATENT DOCUMENTS

| | | | |
|---|---|---|---|
| 3,934,061 | 1/1976 | Keck et al. ........................... | 65/18.2 |
| 4,341,541 | 7/1982 | Dabby et al. ......................... | 65/3.12 |
| 4,345,928 | 8/1982 | Kawachi et al. ...................... | 65/18.2 |
| 4,367,085 | 1/1983 | Suto et al. ............................. | 65/18.2 |
| 4,425,146 | 1/1984 | Izawa et al. ........................... | 65/18.2 |
| 4,494,968 | 1/1985 | Bhagavatula et al. ................ | 65/3.12 |

FOREIGN PATENT DOCUMENTS

| | | | |
|---|---|---|---|
| 57-81213 | 5/1982 | Japan ..................................... | 65/3.12 |
| 58-100801 | 6/1983 | Japan ..................................... | 65/3.12 |
| 2134099 | 8/1984 | United Kingdom ................. | 65/3.12 |

*Primary Examiner*—Robert Lindsay
*Attorney, Agent, or Firm*—Kirschstein, Kirschstein, Ottinger & Israel

[57] ABSTRACT

Integrated optical waveguides, for example planar waveguides with stripes of guiding material formed integrally on a substrate, are manufactured by depositing the doped glass guiding material by plasma chemical vapor deposition. Several substrates can be arranged in a suitably shaped apparatus so that deposition can take place on all of them at once.

12 Claims, 9 Drawing Figures

MANUFACTURE OF INTEGRATED OPTICAL WAVEGUIDES

This invention relates to the manufacture of integrated optical waveguides.

Integrated optical waveguides are waveguides which are integral with a generally planar substrate and in which, either the waveguide is uniform across the plane of the substrate-planar waveguides, or the waveguide consists of stripes of guiding material on the substrate provided in patterns-stripe waveguides. Conventionally such waveguides have been manufactured by depositing the waveguide material—usually glass which has been doped to adjust its refractive index, by deposition of glass particles on the surface of the substrate and then heating to fuse the waveguide. This process however requires very careful temperature control since no glass particles are deposited without a temperature gradient along the direction of flow of the gas incorporating the reactants.

It is thus an object of the invention to provide a method of manufacturing integrated optical waveguides which provides a simpler and easier control over the composition of the deposited glass.

Accordingly, the invention provides, according to one aspect, a method of manufacturing integrated optical waveguides wherein the waveguide is composed of glass deposited in a first layer on a substrate by plasma chemical vapour deposition.

Preferably a second layer of a lower refractive index glass is deposited over said first layer.

In a preferred embodiment of the invention the said first layer of glass is shaped to a desired pattern on the substrate and said second layer of glass is deposited over said desired pattern of glass.

The desired pattern of glass may be formed by selective removal of part of the first layer after deposition so as to leave the desired pattern, the removal conveniently being achieved by masking the first layer with the desired pattern and then etching away the remainder of the first layer of glass.

Alternatively, the desired pattern may be achieved by producing grooves in the desired pattern in the substrate and then depositing the first layer so that the desired pattern is formed at the bottom of the pattern of grooves. In this way removal of the rest of the first layer is not required and the second layer of glass can be immediately deposited over the first layer.

Conveniently, the second layer of glass is also deposited by plasma chemical vapour deposition. The substrate is preferably formed of the same glass as that used for the second layer so that the first layer, forming a core, is embedded within a cladding of lower refractive index glass.

The method according to the invention thus allows the manufacture of large number of planar or striped waveguides forming passive or active integrated optical devices such as beam splitters/combiners, directional couplers or wavelength multiplexers/demultiplexers.

Two methods of manufacturing integrated optical waveguides according to the invention will now be more fully described, by way of example, with reference to the drawings, in which:

FIG. 1 is a schematic diagram of apparatus used for manufacturing integrated optical waveguides according to the invention;

FIGS. 2(a), 2(b), 2(c) and 2(d) show diagrammatically the steps taken in one method according to the invention; and FIGS. 3(a), 3(b), 3(c) and 3(d) show diagrammatically the steps taken in a second method according to the invention.

Referring first to FIG. 2, the desired waveguide pattern is first written on a substrate 11 using photolithography. The substrate is made of a glass having the same index of refraction as that which is to be used to form the cladding layer. The rest of the substrate is then covered with a mask 12 made of a suitable material (FIG. 2(a)) and the pattern etched using any known process e.g. chemically or by ion sputtering. The mask 12 is then removed leaving the substrate covered by a pattern of grooves 13 (FIG. 2(b)) in which the waveguides will be embedded.

The core glass 14 is then deposited on the substrate by plasma chemical vapour deposition as will be described further below with reference to FIG. 1. The core glass 14 constituting the waveguide has an index of refraction slightly higher than that of the cladding layer 15 and the substrate 11 and, by suitably controlling the amount of dopant in the core glass as the deposition process is carried out, it may have any desired refractive-index profile across its thickness which is less than the depth of the grooves 13 so that the waveguide 14 is fully embedded within the grooves 13 (FIG. 2(c)).

Figure 2A:
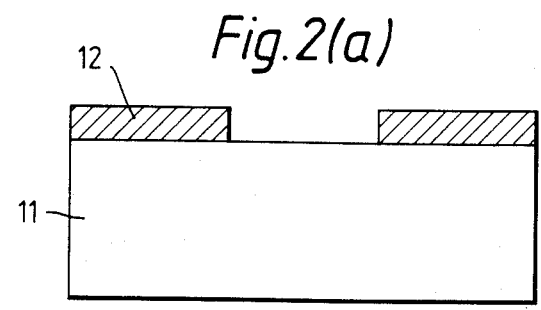
Figure 2B:
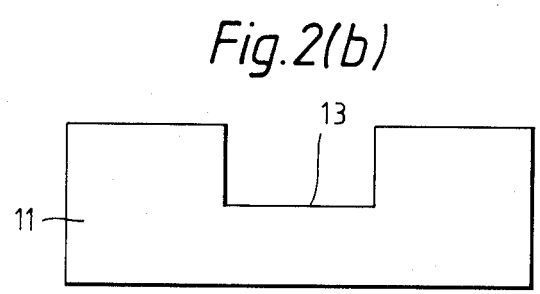
Figure 2C:
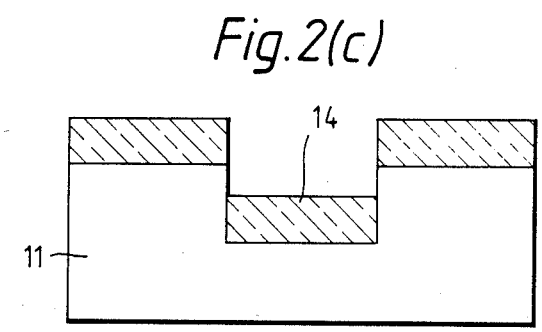
Figure 2D:
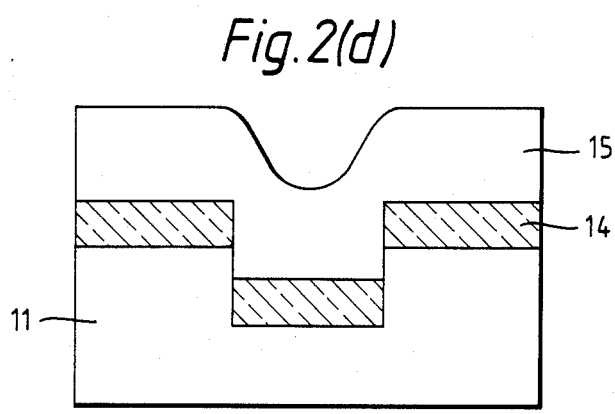

The cladding layer 15 is then deposited, again by plasma chemical vapour deposition, over the core glass 14 to form the completed integrated optical waveguide (FIG. 2(d)).

Figure 3A:
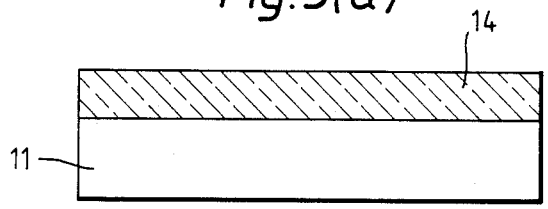
Figure 3B:
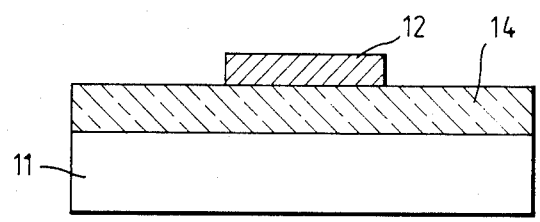
Figure 3C:
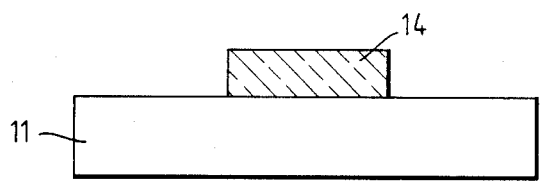
Figure 3D:
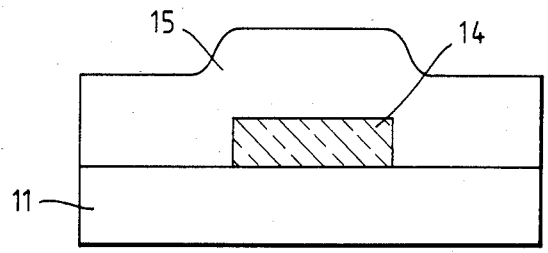

An alternative method of manufacturing integrated optical waveguides is shown in FIG. 3 in which the core material 14 is first deposited by plasma chemical vapour deposition in the form of a planar layer with the required refractive-index profile (FIG. 3(a)). The required waveguide pattern is then written photolithographically on the deposited core layer and this pattern is suitably masked 12 (FIG. 3(b)). The rest of the deposited core layer is completely etched away, either chemically or by ion sputtering or in any other way, and the mask 12 is removed (FIG. 3(c)). Finally the cladding layer 15 is deposited to form the completed integrated optical waveguide (FIG. 3(d)).

For depositing the core and cladding glasses the apparatus shown in FIG. 1 may be used. It consists of a silica tube 1 which has been shaped to provide a shoulder 2 on which a second, shorter silica tube 3 with a smaller diameter is coaxially positioned. The first silica tube 1 is closed at one end, through which a third, perforated silica tube 4 extends into the second, inner tube 3, and is connected at its other end to a vacuum pump (not shown). The perforated silica tube 4 extends coaxially through the inner tube 3 and is perforated throughout the region surrounded by the inner tube 3. It is closed off at its end within the first tube 1 so that gases which are fed into the perforated tube 4 (as indicated by the arrow) must flow through the perforations 5 before being sucked out by the pump.

As the gases flow through the perforations 5, they enter a reaction zone in the inner silica tube 3 where a chemical reaction is initiated by means of a plasma produced in the reaction zone by a microwave cavity 6 positioned below the reaction zone and supplied with power from a microwave generator (not shown). The gases usually consist of oxygen plus the vapours of one or more halides as well as an easily ionizable gas such as argon. The chemical reaction produces glass doped with various dopants as required which is deposited on the substrate 7 mounted within a window 8 cut into the inner silica tube 3 and thus exposed to the reaction zone within the tube 3. The pressure in the reaction zone is maintained at around 10 Torr and the microwave power and relative flow rates of the gases and vapours are adjusted to produce a plasma column of the desired length.

A heating coil 9 is positioned along the length of the reaction zone on the outside of the silica tube 1 to maintain the substrates at a suitable temperature. The temperature does not directly affect the chemical reactions or the deposition rates but is necessary in order that a good thermal match is achieved between the substrate and the deposited layers. Failure to maintain a sufficiently high temperature in the reaction zone could cause the deposited layers to be cracked and/or not adhere to the substrate. A temperature of around 1000° C. is often needed to achieve a good thermal match between the deposited layers and the substrates, however when only thin layers are to be deposited, lower temperatures could be used.

Both the flow rate and the composition of the gaseous mixture flowing through tubes 4 and 3 can be modified (either manually or under computer control) during the deposition time. This allows the composition of the deposited layer, and in particular its refractive index, to be modified so that the desired infractive index profile can be obtained.

Plasma chemical vapour deposition is particularly useful for depositing glass doped with $GeO_2$ so that its photorefractive properties can be utilised for integrated optical devices.

This plasma deposition technique for manufacturing integrated optical waveguides has several major advantages over the conventional deposition methods. The plasma technique is much more flexible, allowing a larger number of materials to be deposited with much more control over the stoichiometry of the deposited layers. The plasma method produces low-scattering waveguides since at no point in the procedure are any particulate materials formed and the material and the refractive index profile can be easily tailored to match those of optical fibres thus enabling very low-loss fusion splicing between the fibres and the integrated optical components.

It will of course be appreciated that although as shown, only one substrate is being held within the deposition apparatus, any number can be mounted within the apparatus provided the length of the tubes is adjusted accordingly.

We claim:

1. A method of manufacturing an integrated optical waveguide in which the waveguide is composed of glass deposited in a first layer on a substrate by a chemical vapour deposition process wherein a chemical reaction for effecting the deposition process is initiated by means of a plasma produced in a reaction zone by a microwave cavity and supplied with power from a microwave generator.

2. A method according to claim 1 wherein a second layer of a glass having a lower refractive index than the first layer is deposited over the first layer.

3. A method according to claim 2 wherein the first layer of glass is shaped to a desired pattern on the substrate and the second layer of glass is deposited over said pattern of glass.

4. A method according to claim 3 wherein said desired pattern is produced by forming grooves having the said pattern in the substrate and depositing the first layer at the bottom of the pattern of grooves.

5. A method according to claim 2 wherein the second layer of glass is also deposited by chemical vapour deposition.

6. A method according to claim 2 wherein the substrate is formed of the same glass as that used to form the second layer so that the first layer, forming a core, is embedded within a cladding of lower refractive index glass.

7. A method according to claim 1 wherein the substrate is mounted so as to be exposed to the interior of a reaction tube having an inner perforated tube extending into it, and mounted within an outer tube, reaction vapours in a carrier gas and oxygen are introduced into the reaction tube through the perforations in the inner perforated tube whilst the pressure within the reaction tube is maintained at around 10 Torr, and the microwave power and flow rates are controlled to produce a plasma column at least over the region occupied by the substrate, whilst the latter is heated, to produce said chemical reaction and the deposition of a layer of glass on the substrate.

8. A method of manufacturing an integrated optical waveguide, comprising the steps of: mounting a substrate within an opening in a wall of a reaction tube with one face of the substrate exposed to the interior of the tube; supporting the reaction tube within an outer tube so that the reaction tube surrounds a perforated inner tube; introducing into the reaction tube through perforations in the inner tube a gaseous mixture having oxygen and at least one vapor capable of reacting therewith to produce a glass; maintaining the pressure within the reaction tube at a low pressure; heating the substrate; and producing a plasma column within the reaction tube at least over the region occupied by the substrate by means of a microwave cavity and supplied with power from a microwave generator, so as to cause a chemical reaction to take place within the reaction tube and a layer of glass to be deposited on said one face of the substrate.

9. A method according to claim 8 wherein the supporting step is performed by supporting the inner and outer tubes and the reaction tube with their axes vertical, the lower end of the outer tube being of reduced diameter so as to provide an internal shoulder which supports the reaction tube; and wherein the maintaining step is performed by evacuating the interior of the reaction tube through the lower end of the outer tube; and wherein the introducing step is performed by feeding the oxygen and the at least one reaction vapor into the upper end of the inner tube.

10. A method according to claim 9 wherein the maintaining step maintains the pressure within the reaction tube at around 10 torr, and the heating step heats the substrate to a temperature of approximately 1000° C.

11. A method according to claim 9; and further comprising modifying the flow rate and/or the composition of the gaseous mixture during the deposition of the glass layer.

12. A method according to claim 8 wherein the substrate is substantially planar, and wherein the mounting step is performed by positioning the substantially planar substrate within the reaction tube at a location which causes minimum disturbance to the plasma column and which causes the glass layer to be deposited with a substantially uniform thickness over the substantially planar substrate.

* * * * *